UNITED STATES PATENT OFFICE.

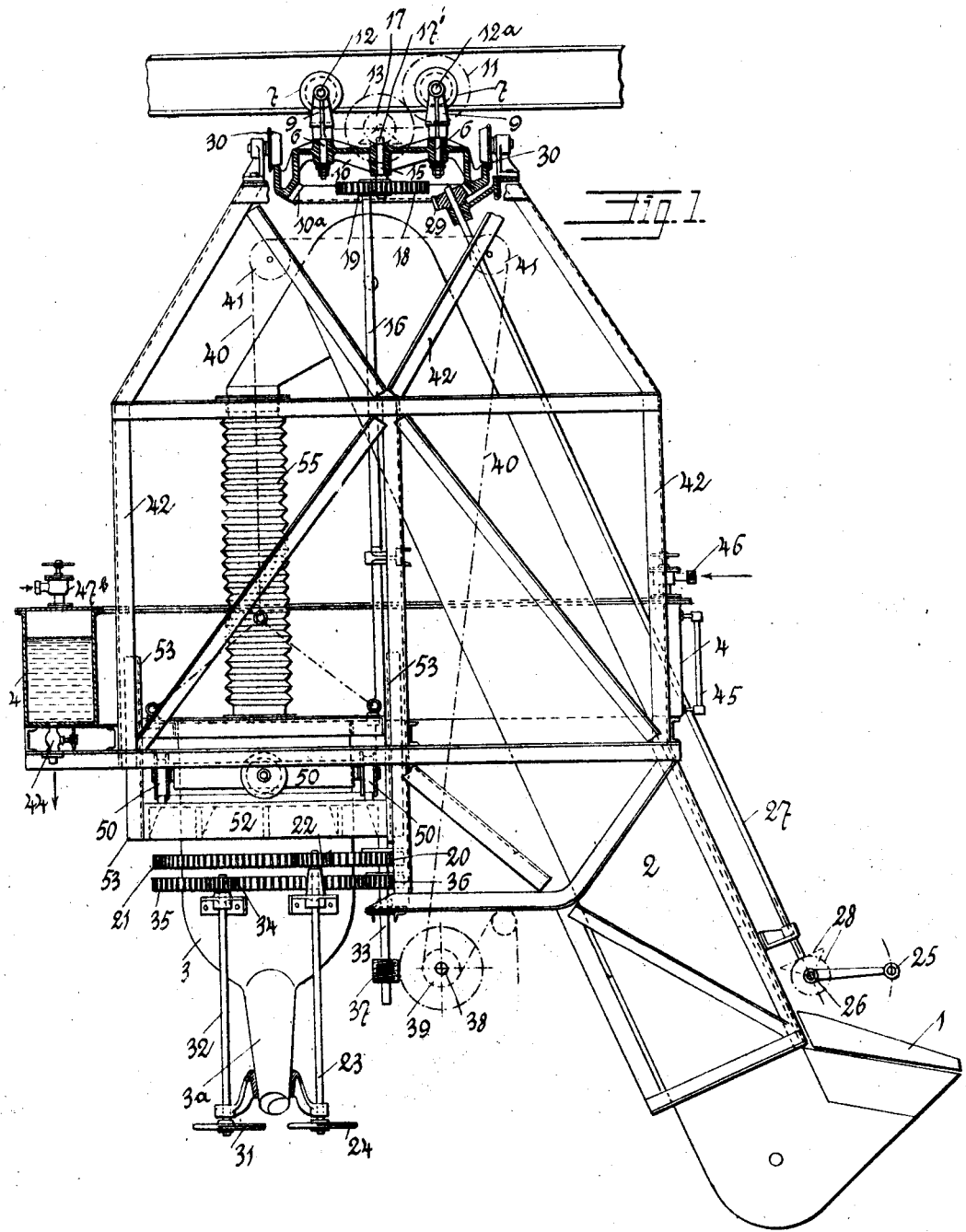

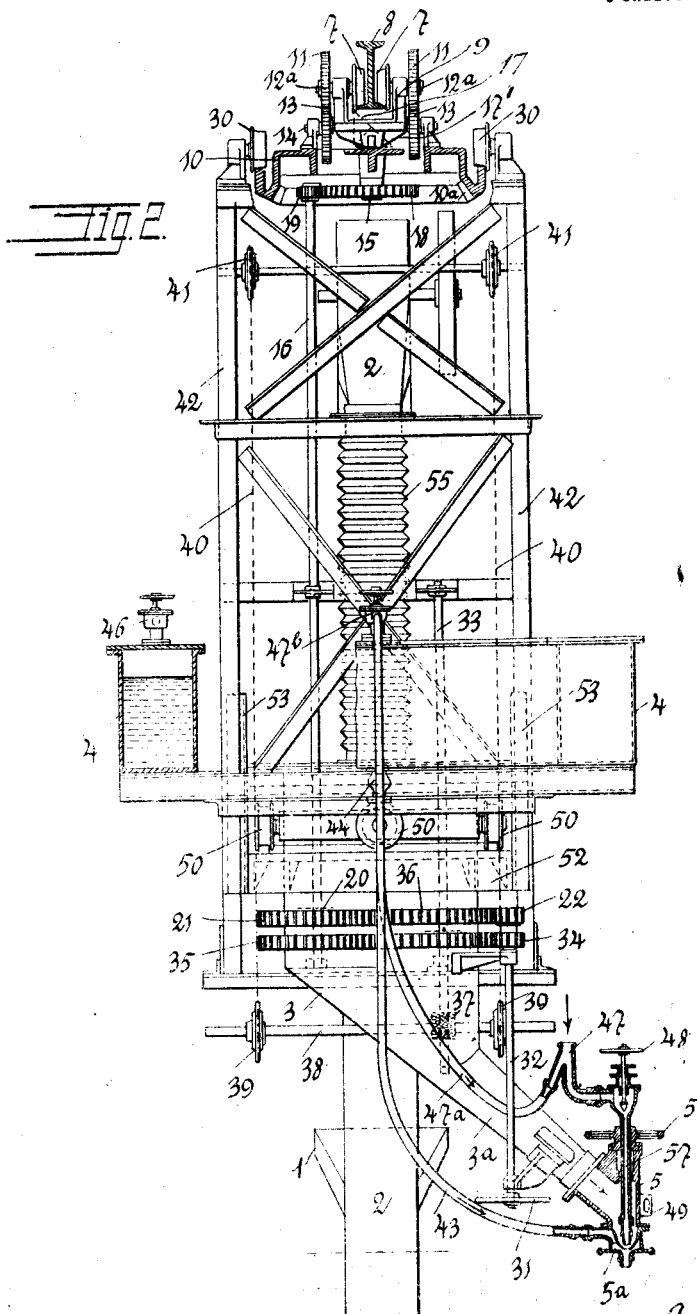

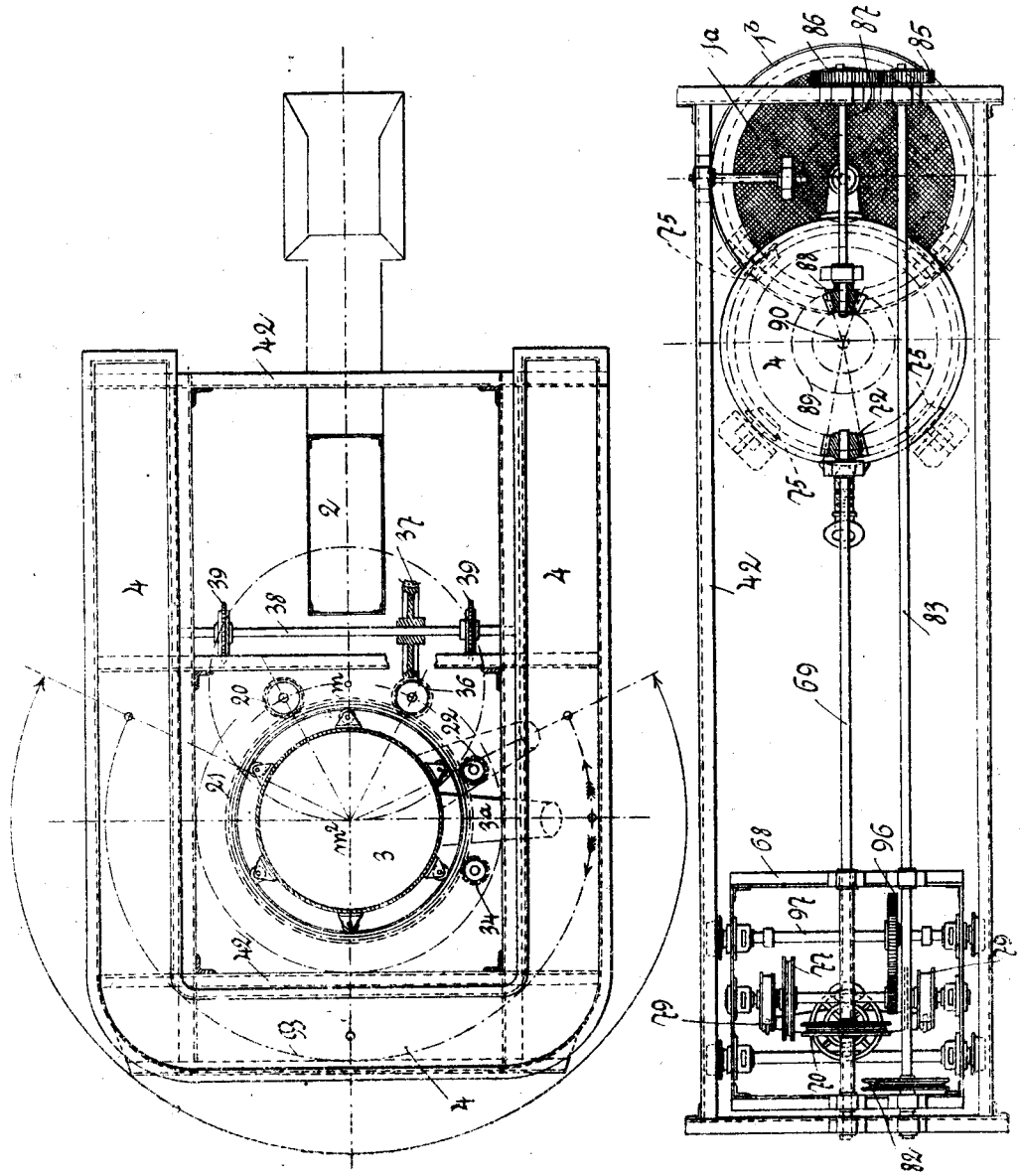

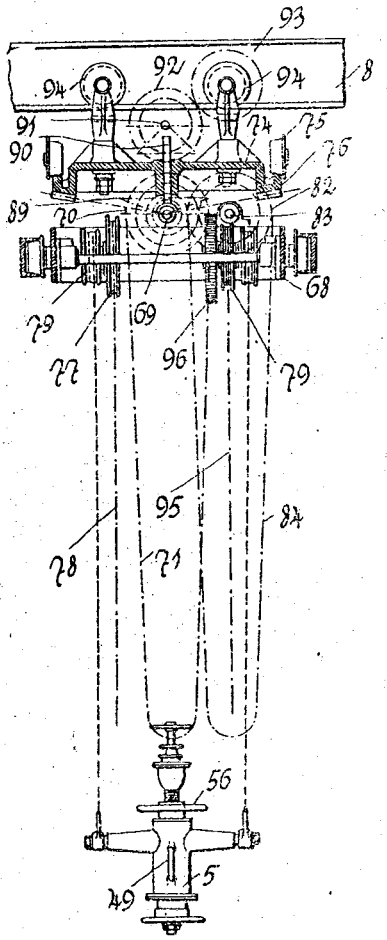

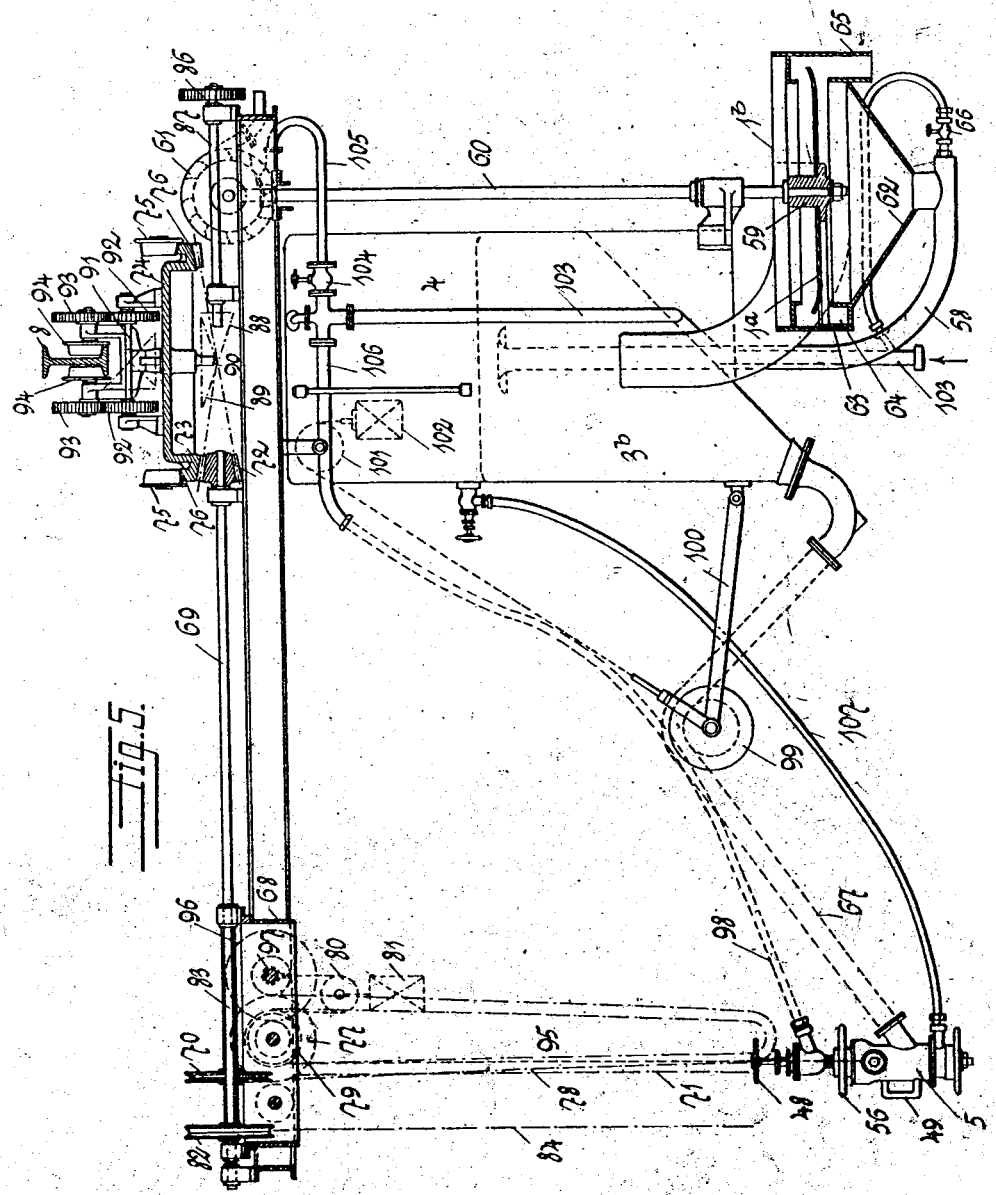

WILHELM KURZE, OF WILHELMSHÜTTE, NEUSTADT-ON-THE-RÜBENBERGE, GERMANY.

MOLDING-MACHINE.

1,201,200.  Specification of Letters Patent.  Patented Oct. 10, 1916.

Application filed September 18, 1912. Serial No. 720,942.

*To all whom it may concern:*

Be it known that I, WILHELM KURZE, a subject of the King of Prussia, residing at Wilhelmshütte, Neustadt-on-the-Rübenberge, near Hanover, Kingdom of Prussia, German Empire, have invented certain new and useful Improvements in Molding-Machines, of which the following is a specification.

The present invention relates to a traveling molding machine, in which the molding material is forced in known manner by means of compressed air into a mold or a mold flask.

According to the present invention the frame supporting the water tank and the sand container with the mixing nozzle is displaceable on a rail and pivotally suspended, the sand container allowing of being separately turned and raised or lowered together with the mixing nozzle. The mixing nozzle can therefore be easily and conveniently moved to any point, so that it will be possible to quickly and conveniently fill all molds and mold flasks in the foundry with the molding material.

In the accompanying drawings, which exemplify constructional forms of the invention, Figure 1 is a side view of the molding machine according to the present invention, Fig. 2 is a front view and Fig. 3 is a plan of Fig. 1. Fig. 4 is a front view of a modified constructional form of the molding machine; Fig. 5 is a side view and Fig. 6 is a plan of the same constructional form according to Fig. 4.

In the several views certain parts are shown in section for the sake of clearness.

With reference to the Figs. 1-3 in the drawing the molding machine of this constructional form consists essentially of a sand container with the thereto attached mixing nozzle and the water tank required for moistening the sand. The said parts are arranged in a frame 42 reinforced by stays. This frame is suspended from a traveling rail 8. At the upper end of the frame 42 is provided a supporting disk 10 in which the two posts 6 are secured; these posts terminate in yokes 9. On the pins 12, 12ᵃ journaled in the ends of the latter are fitted rollers 7, which travel on the rail 8 having the shape of a T-girder. On the pins 12ᵃ of the one yoke are fitted on the outside two spur gears 11, which mesh with corresponding spur gears 13 on a shaft 14. This shaft 14 is mounted in bearings, which are fitted in a suitable manner to the said supporting disk 10. The other pair of wheels on the pins 12 of the yoke 9 is rotatably fitted to the supporting disk 10 so that it is possible for the whole machine to be run through a curve.

For moving the frame the following arrangement is provided: On the shaft 14 carrying the spur gears 13 meshing with the spur gears 11 of the one yoke 9, is fitted a bevel gear 17, which meshes with a second bevel gear 17' on a vertical shaft 15, as shown by dotted lines in Figs. 1 and 2. This shaft 15 is journaled in a bearing in the supporting disk 10. At the lower end of this shaft is fitted a gear 18 which meshes with a gear 19 on shaft 16. The shaft 16 extending downward and supported and held in a suitable manner to the frame, carries at its lower end a gear 20, which meshes with a toothed flange 21 arranged and guided on the sand container. The gear 20 is feathered to the shaft 16 in such a manner, that it can be axially displaced thereon for reasons which shall hereinafter be described. The toothed flange 21 is fitted loose and easily rotatable on the sand container. For the said purpose the toothed flange may for instance be guided by a flanged or U-shaped ring secured to the sand container and balls or the like being arranged between the toothed flange and said ring for reducing the friction. In the toothed flange 21 is engaged a pinion 22, which is fitted to the handwheelshaft 23, and this shaft is journaled in a bearing attached to the sand container and carries at its lower end a handwheel 24. It is evident, that by turning this handwheel 24 to the one or the other direction the spur gears 13, and thereby also the spur gears 11 keyed to the shafts 12ᵃ with the wheels 7 may be revolved by the aid of the toothed flange and the said gears, so that the machine will travel.

For swiveling and swinging out the machine the following arrangement is provided: The frame has at its upper edge turned toward the rail 8 a number of rollers 30. The supporting disk is bent over in the shape of an U at its edges and thereby forms paths on which the said rollers 30 travel. On the elevator 2, in the lower end of which is arranged a rocking screen 1, are provided bearings, in which is journaled a shaft 27.

At the lower end of the same is fitted a bevel gear which meshes with a second bevel gear 28 on the shaft 26, which is rotated by means of a crank handle 25 or the like. At the upper end of the shaft 27 is fitted a bevel gear 29 which engages a toothed flange 10ª formed on the supporting disk 10. By turning the crank 25 the frame will therefore by the aid of the shaft 27 and the bevel gear 29 engaging in the toothed flange 10ª be turned around the supporting disk 10.

The raising and lowering of the sand container 3 is effected by the turning of the handwheel 31, which is fitted to a shaft 32. At the upper end of the same is fixed a pinion 34 which engages in a toothed flange 35 on the sand container. Also this toothed flange 35 is, as the above mentioned toothed flange 21 fitted and easily rotatable on the sand container. For this purpose the same devices as mentioned above may be employed. The said toothed flange 35 is in engagement with a pinion 36 which is fitted to the shaft 33. The gear 36 is feathered to the shaft 33, so that when the sand container is raised and lowered, by the engagement of the toothed flange 35 the gear 36 can slide to and fro on the shaft 33 without its engagement with the said toothed flange being interrupted. To the lower end of the shaft 33 is fitted a worm wheel 37 which engages with a second worm wheel on a shaft 38. To the shaft 38 are keyed sprocket wheels 39 over which travel link chains 40. These are carried over rollers 41, 41 on the frame and serve to support the sand container (see Figs. 1 and 2). It is evident from the aforesaid, that the turning of the handwheel 31 will by means of the toothed flange 35 and the gear 36 turn the worm wheel 37, so that in consequence thereof the shaft 38 is turned, and the link chains will be wound up or unwound respectively according to the direction in which the shaft is turned, so that the sand container will be raised or lowered. The wormwheel gearing 37 is self-locking, so that the sand container will remain stationary in every position to which it is adjusted.

For avoiding the disengagement of the toothed flange and the gear 20, while the sand container is being raised or lowered, the gear 20 is arranged to slide on the shaft 16 in the aforedescribed manner. The gear 20 will be displaced on this shaft by its engagement with the toothed flange 21, when the sand container is raised or lowered.

The water tank required for moistening the sand emerging from the mixing nozzle is secured to the frame 42. The water tank communicates with the mixing nozzle 5ª by means of a rubber tube 43 or the like. For allowing of completely cutting off the water supply a valve 46 is provided on the water tank 4. The compressed air is supplied through a pipe 47, (Fig. 2), and the supply being controlled by means of a valve fitted with a handwheel 48. The compressed air is also conducted into the water tank by means of a short end of the pipe 47 which is connected by means of a flexible tube 47ª or the like with the water tank 4. This affords the advantage, that the water will be under the pressure of the compressed air, so that it will meet no resistance when emerging from the water nozzle and is the more easily diffused. In the flexible tube 47ª a stop valve 47ᵇ is fitted, and besides a gage glass 45 is fitted to the water tank. For filling the tank a connection pipe 46 provided with a valve is arranged on the tank.

The operation is as follows:

The sand is thrown on to the rocking screen, whereupon, after all unserviceable parts have been retained by the screen, it is conducted to the elevator. The latter will now take the sand through the bellows connection 55 into the sand container 3, where it passes through the funnel shaped bottom into the supply pipe 3ª and thence into the mixing nozzle 5. Here the material is moistened by the diffused water emerging from the regulable and exchangeable water nozzle 5ª. Owing to the peculiar form of the apparatus the range of its applicability is unlimited. The sand container with the mixing nozzle can, on the one hand, by turning the frame in the above described manner around the center m, (Fig. 3) be swung through a circle, and besides the sand container may by turning around the center m² be swung out in a circular path B, so that it will be possible to reach all molds and fill them with sand from the apparatus.

In the constructional form shown in Figs. 4, 5 and 6 a rotary sand screen 1ᵇ is provided in place of the rocking screen and in place of the elevator a conveying tube 58 is employed, through which the material is conveyed by compressed air into the sand container 3ᵇ. The rotary sand screen consists essentially of a screening disk 1ª which is fitted with its boss 59 to a shaft 60. The upper end of said shaft is coupled by means of a bevel gearing or the like to a second shaft to which the driving wheel 61 is secured. According to the drawing the latter is driven by means of compressed air, although the wheel may also be driven by any other suitable means. Below the screen disk 1ª is provided a funnel 62, the lower end of which leads into the conveyer tube 58. At the edge of the funnel is provided a gutter 63, into which a carrier 64 engages, which is connected to the boss 59 of the screen disk.

After dry sand has been thrown on to the screen disk any parts retained by the latter will slip over the edge into the gutter 63 and then be removed by the carrier 64 until they fall out through an opening 65. The conveyer tube 58 discharges into the sand container 3ᵇ and the front end of the conveyer tube is connected to the supply pipe for the compressed air, a valve 66 and a suitable nozzle being provided. The sand which has passed the screen 1ᵃ and falls from the funnel 62 into the conveyer tube 58 will therefore be carried by the compressed air into the sand container after the valve 66 has been opened. The lower end of the sand container communicates by the intermediate fitting 67 with the mixing nozzle 5. The sand is conveyed from the sand container to the nozzle by the pressure prevailing in the said container, the suction of the mixing nozzle assisting this conveying of the sand.

The raising and lowering and the displacing of the mixing nozzle 5 is effected by means of a trolley 68, (see Figs. 5 and 6), which can be operated by means of chains from the place where the nozzle man is standing.

For swinging out the apparatus the following arrangement is provided: On a shaft 69 journaled in the trolley 68 is fitted a sprocket wheel 70, the operating chain 71 of which hangs down and may be easily seized. At the outer end of the shaft 69 is provided a bevel gear 72 which engages with the toothed flange 73 on the underside of the supporting disk 74. The frame in this constructional form is provided with four rollers 75 engaging a circular rail 76 formed on the supporting disk. The latter is suspended from the traveling rail. By pulling the chain 71, the wheel 72 will be turned by the shaft 69 and the apparatus will be swung out.

The mixing nozzle is raised and lowered by means of a chain wheel 77, over which an operating chain 78 is passed. To the shaft of the sprocket wheel 77 are fitted the rope pulleys 79 (Figs. 4 and 6) over which run ropes or chains, which support the mixing nozzle. The weight of the mixing nozzle is balanced by a counterpoise 81 fitted to the roller 80.

For traveling the apparatus back and forward a sprocket wheel 82 is fitted to the shaft 83, Fig. 6 and a chain 84 is passed over the wheel 82. To the outer end of the shaft 83 is fitted a gear wheel 85 which meshes with a gear wheel 86 on shaft 87. To the other end of the said shaft, Fig. 5, is fitted a bevel gear 88, which meshes with a corresponding bevel gear 89 on the shaft 90. By means of another bevel gearing the shaft 90 drives the horizontal shaft 91, Fig. 5, to which are fitted two gear wheels 92. The latter engage with the gears 93, which drive the wheels 94 of the one post 6.

For horizontally displacing the mixing nozzle a wheel 96, (Figs. 5 and 6,) is rotated by means of a chain 95; the said wheel being fitted on a shaft 97. To this shaft is also fitted the one pair of wheels of the trolley. When the wheel 96 is turned, also the trolley and with it the mixing nozzle will be displaced. For avoiding all damage to the connecting piece 67 and the tube 98 for the compressed air supply while the mixing nozzle is being displaced, the said parts are carried over a roller 99. This roller is fitted to an arm 100, which is pivotally fitted to the sand container. A yoke coupled to the pin of the said roller is connected with a rope or the like which runs over roller 101 on the frame and carries at its free end a weight 102, which has the object to counterbalance the connecting piece 67 and the tube 98. The tube 103 for supplying the compressed air is branched at its lower end, and to this branch is fitted the aforementioned valve 66 with a nozzle, in order to force the sand from the conveyer pipe into the container. To the upper end is attached an arm 105 having a valve 104, through which the compressed air is conducted to the driving wheel 61 for the screening arrangement. The other arm 106 is connected by means of the above mentioned connecting tube 98 to the mixing nozzle 5. The water tank 4 which may also be fitted with a level gage, communicates by means of a flexible tube 107 or the like with the lower part of the mixing nozzle.

I claim:

1. In a molding machine of the character described, in combination, a track rail, a frame supported thereon and carrying a water tank, a sand container and a mixing nozzle operatively connected to said tank and to said container, and means for moving said frame along said track rail.

2. In a molding machine of the character described, in combination, a track rail, a frame supported thereon and carrying a water tank, a sand container and a mixing nozzle operatively connected to said tank and to said container, and means for rotating said frame.

3. In a molding machine of the character described, in combination, a track rail, a frame supported thereon and carrying a water tank, a sand container and a mixing nozzle operatively connected to said tank and to said container, means for rotating said frame, and means for moving said frame along said track rail.

4. In a molding machine of the character described, in combination, a track rail, a disk provided with wheels engaging said rail, said disk being provided with a path or track, a frame, and wheels carried by said frame and engaging said path or track, whereby said frame is rotatably supported by said disk.

5. In a molding machine of the character described, in combination, a track rail, a disk provided with wheels engaging said rail, said disk being provided with annularly arranged teeth, said disk being provided with a path or track, a frame, wheels carried by said frame and engaging said path or track, whereby said frame is rotatably supported by said disk, and means carried by said frame and engaging said teeth for rotating said frame relatively to said disk.

6. In a molding machine of the character described, in combination, a track rail, a frame, wheels operatively connected to said frame and engaging said rail whereby said frame may be moved there along, gearwheels carried by the axles of said wheels and rotatable therewith, and means operatively connected to said frame and engaging said gear wheels for causing said frame to travel on said rail.

7. In a molding machine of the character described, in combination, a track rail, a frame movably supported thereon, a sand container supported on said frame, and means for raising and lowering said container relatively to said frame.

8. In a molding machine, in combination, a frame, a sand container and a water tank supported on said frame, a mixing nozzle operatively associated with said water tank and said sand container, and means for raising and lowering said nozzle relatively to said frame.

In testimony whereof I have affixed my signature in presence of two witnesses.

WILHELM KURZE.

Witnesses:
T. HENDY REED,
MINNER CASSEL.